United States Patent
Schmitt (10) Patent No.: US 12,362,893 B2
(45) Date of Patent: Jul. 15, 2025

(54) MULTI-CARRIER TRANSMISSION

(71) Applicant: Cable Television Laboratories, Inc., Louisville, CO (US)

(72) Inventor: Matthew D. Schmitt, Broomfield, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 1156 days.

(21) Appl. No.: 15/601,764

(22) Filed: May 22, 2017

(65) Prior Publication Data

US 2017/0257206 A1 Sep. 7, 2017

Related U.S. Application Data (63) Continuation of application No. 13/539,333, filed on Jun. 30, 2012, now Pat. No. 9,660,792.

(51) Int. Cl.
*H04L 5/00* (2006.01)
*H04L 1/00* (2006.01)
(Continued)

(52) U.S. Cl.
CPC .......... *H04L 5/0094* (2013.01); *H04L 1/0003* (2013.01); *H04L 12/2801* (2013.01);
(Continued)

(58) Field of Classification Search
CPC ....... H04L 1/0003; H04L 5/0007; H04L 5/00; H04L 5/0001; H04L 5/003; H04L 5/0037;
(Continued)

(56) References Cited

U.S. PATENT DOCUMENTS 5,764,699 A * 6/1998 Needham .............. H04L 1/0003
375/261
6,002,722 A * 12/1999 Wu ..................... H04M 11/062
375/357

(Continued)

FOREIGN PATENT DOCUMENTS

KR 2005009856 A * 1/2005 ......... H04N 21/2343
KR 2007057637 A * 6/2007 ......... H04L 12/2801
(Continued)

OTHER PUBLICATIONS

Cable Television Laboratories, Data Over Cable Service Interface Specifications DOCSIS 3.0 Physical Layer Specification CM-SP-PHYv3.0-I09-101008, 2010, pp. 144, 259 (Year: 2010).*
(Continued)

*Primary Examiner* — Michael Thier
*Assistant Examiner* — Jose L Perez
(74) *Attorney, Agent, or Firm* — Josh C. Snider; Snider IP (57) ABSTRACT

A multi-carrier transmission system configured to enable variable modulation order reception is contemplated. The system may be configured to facilitate delivery of high-speed data (HSD) over frequency division duplexing (FDD) and/or time division duplexing (TDD) infrastructures to a plurality of receiving devices. Signaling used to facilitate delivery of the HSD may be selectively and dynamically modulated according to performance capabilities of the receiving devices for a given transmission interval.

19 Claims, 2 Drawing Sheets

(51) Int. Cl.
*H04L 12/28* (2006.01)
*H04L 5/14* (2006.01)

(52) U.S. Cl.
CPC ........ *H04L 12/2878* (2013.01); *H04L 5/0007* (2013.01); *H04L 5/0046* (2013.01); *H04L 5/143* (2013.01); *H04L 5/1469* (2013.01)

(58) Field of Classification Search
CPC ... H04L 5/0042; H04L 5/0044; H04L 5/0046; H04L 5/0094; H04L 5/143; H04L 5/1469; H04L 12/26; H04L 12/2801; H04L 12/2878

See application file for complete search history.

(56) References Cited

U.S. PATENT DOCUMENTS

| | | | | |
|---|---|---|---|---|
| 6,459,703 B1* | 10/2002 | Grimwood | H04J 3/1694 | 370/441 |
| 6,598,232 B1* | 7/2003 | McAlear | H04N 7/102 | 725/127 |
| 6,678,740 B1* | 1/2004 | Rakib | G08B 13/19656 | 348/E7.069 |
| 6,690,655 B1* | 2/2004 | Miner | H04L 12/2801 | 370/278 |
| 6,891,858 B1* | 5/2005 | Mahesh | H04L 1/0003 | 370/235 |
| 8,290,077 B1* | 10/2012 | Ben-Eli | H04L 27/183 | 370/335 |
| 8,310,926 B1 | 11/2012 | Bernstein | | |
| 9,660,792 B2* | 5/2017 | Schmitt | H04L 5/0094 | |
| 9,699,102 B2* | 7/2017 | Cloonan | H04L 47/34 | |
| 2002/0044610 A1* | 4/2002 | Jones | H04L 5/0046 | 375/261 |
| 2002/0078464 A1* | 6/2002 | Dravida | H04L 47/2491 | 706/62 |
| 2002/0108120 A1* | 8/2002 | Bahraini | H04N 21/6583 | 725/109 |
| 2002/0126768 A1* | 9/2002 | Isaksson | H04L 5/0007 | 375/298 |
| 2002/0131426 A1* | 9/2002 | Amit | H04L 12/2801 | 370/409 |
| 2002/0132629 A1* | 9/2002 | Desai | H04L 12/2874 | 455/500 |
| 2002/0181423 A1* | 12/2002 | Chen | H04L 63/068 | 370/347 |
| 2002/0196736 A1* | 12/2002 | Jin | H04L 12/12 | 370/229 |
| 2003/0035442 A1 | 2/2003 | Eng | | |
| 2003/0053484 A1* | 3/2003 | Sorenson | H04J 4/00 | 370/468 |
| 2004/0006771 A1* | 1/2004 | Dale | H04N 7/17309 | 725/111 |
| 2004/0068748 A1* | 4/2004 | Currivan | H04B 1/71 | 725/111 |
| 2004/0136393 A1* | 7/2004 | Riveiro Insua | H04L 5/0046 | 370/432 |
| 2004/0240535 A1 | 12/2004 | Verma | | |
| 2004/0244043 A1* | 12/2004 | Lind | H04N 7/17309 | 725/111 |
| 2004/0258168 A1* | 12/2004 | Propp | H04L 1/0003 | 375/260 |
| 2004/0259605 A1* | 12/2004 | Quigley | H04L 12/2801 | 455/574 |
| 2005/0085236 A1* | 4/2005 | Gerlach | H04L 5/0046 | 455/450 |
| 2005/0155082 A1* | 7/2005 | Weinstein | H04H 20/46 | 725/131 |
| 2005/0157803 A1 | 7/2005 | Kim et al. | | |
| 2006/0262722 A1* | 11/2006 | Chapman | H04L 12/2801 | 370/229 |
| 2006/0280197 A1* | 12/2006 | Stone | H04N 21/4131 | 370/461 |
| 2007/0121546 A1* | 5/2007 | Zuckerman | H04L 5/023 | 370/329 |
| 2007/0140298 A1* | 6/2007 | Eng | H04N 21/6168 | 375/E7.025 |
| 2007/0204300 A1 | 8/2007 | Markley | | |
| 2007/0245393 A1 | 10/2007 | Fernandez | | |
| 2008/0320354 A1* | 12/2008 | Doppler | H04L 1/1893 | 714/748 |
| 2009/0052387 A1* | 2/2009 | Lee | H04W 28/06 | 370/329 |
| 2009/0135713 A1 | 5/2009 | Hwang | | |
| 2010/0183306 A1* | 7/2010 | Pangrac | H04N 7/22 | 398/72 |
| 2010/0223650 A1* | 9/2010 | Millet | H04L 41/0631 | 370/242 |
| 2010/0254283 A1 | 10/2010 | Hanks | | |
| 2010/0255851 A1* | 10/2010 | Kwak | H04L 5/0041 | 455/450 |
| 2010/0260081 A1* | 10/2010 | Damnjanovic | H04L 5/0053 | 455/70 |
| 2010/0309935 A1* | 12/2010 | Rabenko | H04L 12/66 | 375/222 |
| 2011/0051657 A1* | 3/2011 | Li | H04L 1/0026 | 370/328 |
| 2011/0176466 A1* | 7/2011 | Lindoff | H04W 52/0238 | 375/316 |
| 2011/0185394 A1* | 7/2011 | Rakib | H04J 3/0682 | 725/111 |
| 2011/0197243 A1 | 8/2011 | Kuo et al. | | |
| 2011/0255452 A1* | 10/2011 | Brooks | H04L 12/2801 | 370/297 |
| 2011/0267951 A1 | 11/2011 | Stanwood et al. | | |
| 2011/0274148 A1* | 11/2011 | Urban | H04L 1/0002 | 375/222 |
| 2011/0280201 A1* | 11/2011 | Luo | H04L 5/0094 | 370/329 |
| 2011/0292785 A1* | 12/2011 | Hardin | H04L 5/003 | 375/261 |
| 2012/0011557 A1 | 1/2012 | Mathews et al. | | |
| 2012/0093172 A1* | 4/2012 | Tzannes | H04L 1/0075 | 370/431 |
| 2012/0195184 A1* | 8/2012 | Dapper | G06F 17/14 | 370/210 |
| 2012/0213164 A1* | 8/2012 | Zuckerman | H04W 72/20 | 370/329 |
| 2012/0213259 A1 | 8/2012 | Renken et al. | | |
| 2012/0291084 A1* | 11/2012 | Rakib | H04N 21/6118 | 725/111 |
| 2013/0276047 A1* | 10/2013 | Chapman | H04N 21/6547 | 725/111 |
| 2014/0016636 A1* | 1/2014 | Prodan | H04L 12/2801 | 370/389 |
| 2014/0056316 A1* | 2/2014 | Ling | H04L 12/2863 | 370/468 |

FOREIGN PATENT DOCUMENTS

| | | | | |
|---|---|---|---|---|
| WO | WO-0056928 A2 * | 9/2000 | | H04L 12/2803 |
| WO | WO-2010056654 A2 * | 5/2010 | | H04W 56/001 |

OTHER PUBLICATIONS

Cable Television Laboratories, Data-Over-Cable Service Interface Specifications DOCSIS 3.0 MAC and Upper Layer Protocols Interface Specification, 2010, pp. 40-41 (Year: 2010).*

CableLabs, Data Over Cable Service Interface Specifications DOCSIS 3.0 Physical Layer Specification, Oct. 8, 2010, p. 19 ( Year: 2010).*

CableLabs, Data-Over-Cable Service Interface Specifications DOCSIS 3.0 OSSI Configuration Management Technical Report, Sep. 26, 2008, p. 10, 27 (Year: 2008).*

CableLabs, Data-Over-Cable Service Interface Specifications DOCSIS 3.0 MAC and Upper Layer Protocols Interface Specification, Jun. 11, 2010, p. 147, 200, 627 (Year: 2010).*

Choi et al., Internet Protocol Data Transmission Apparatus and Method Using Existing Transmission System and Broadband Down- (56) References Cited

OTHER PUBLICATIONS link Transmission System in Optical Coaxial Hybrid Network, Jun. 7, 2007, KIPO [English translation of KR 2007/0057637 A by EPO website], whole document (Year: 2007).*
Chang et al., Digital Contents Receiver System, Jan. 26, 2005, KIPO [English translation of KR 2005/0009856 A by EPO website], whole document (Year: 2005).*
Cable Television Laboratories, Inc., Data Over Cable Service Interface Specifications DOCSIS 3.0 Physical Layer Specification CM-SP-PHYv3.0-I09-101008, Oct. 8, 2010, pp. 61, 91, 97-100, 142.
Cable Television Laboratories, Inc., "Data-Over-Cable Service Interface Specifications Technical Reports, DOCSIS 3.1 Profile Management Application Technical Report," CM-TR-PMA-V01-180530, May 30, 2018, 70 pages.

* cited by examiner

Fig. 1

MULTI-CARRIER TRANSMISSION

CROSS-REFERENCE TO RELATED APPLICATIONS

This application claims the benefit of U.S. application Ser. No. 13/539,333 filed Jun. 30, 2012, the disclosure and benefit of which is incorporated in its entirety by reference herein.

TECHNICAL FIELD

The present invention relates to multi-carrier transmissions, such as but not necessarily limited to use of multi-carrier transmissions to enable the delivery of high-speed data (HSD) at variable modulation orders depending on capabilities of a receiving device.

BACKGROUND

In an HSD system dependent on signals being transmitted over radio frequencies, such as but not necessarily limited to the HSD system defined according to Data Over Cable Service Interface Specification (DOCSIS), the disclosure of which is hereby incorporated by reference in its entirety, a headend device or other sourcing device may be configured to transmit a continuous signal in the downstream direction for all customer premise equipment (CPE) devices on a corresponding segment or portion (e.g., bonding group) of the network. The CPE devices may be configured to listen to the continuous signal in order to identify conditions during which data, such as HSD, addressed to them will be carried over the network. Among other things, this signal may be used to transmit control data used to keep the devices synchronized and locked to the headend, as well as to serve in effect as a keep alive. Such a DOCSIS system is considered a point-to-multipoint network with individual carriers, where the signals transmitted by the headend must be received and shared by all CPE devices. The data signal, therefore, has to be set to the lowest common denominator or set to the performance level of the lowest performing CPE device receiving the signal. The lowest common denominator may be determined based on various capabilities associated with facilitating communications with the corresponding CPE devices, such as an ability of the CPE devices to process certain frequency ranges or noise associated with signaling paths used to communicate with the CPE devices. Tailoring the data signal to the lowest common denominator can reduce the efficiency of the system since the capabilities of higher performing CPE devices may be underutilized.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
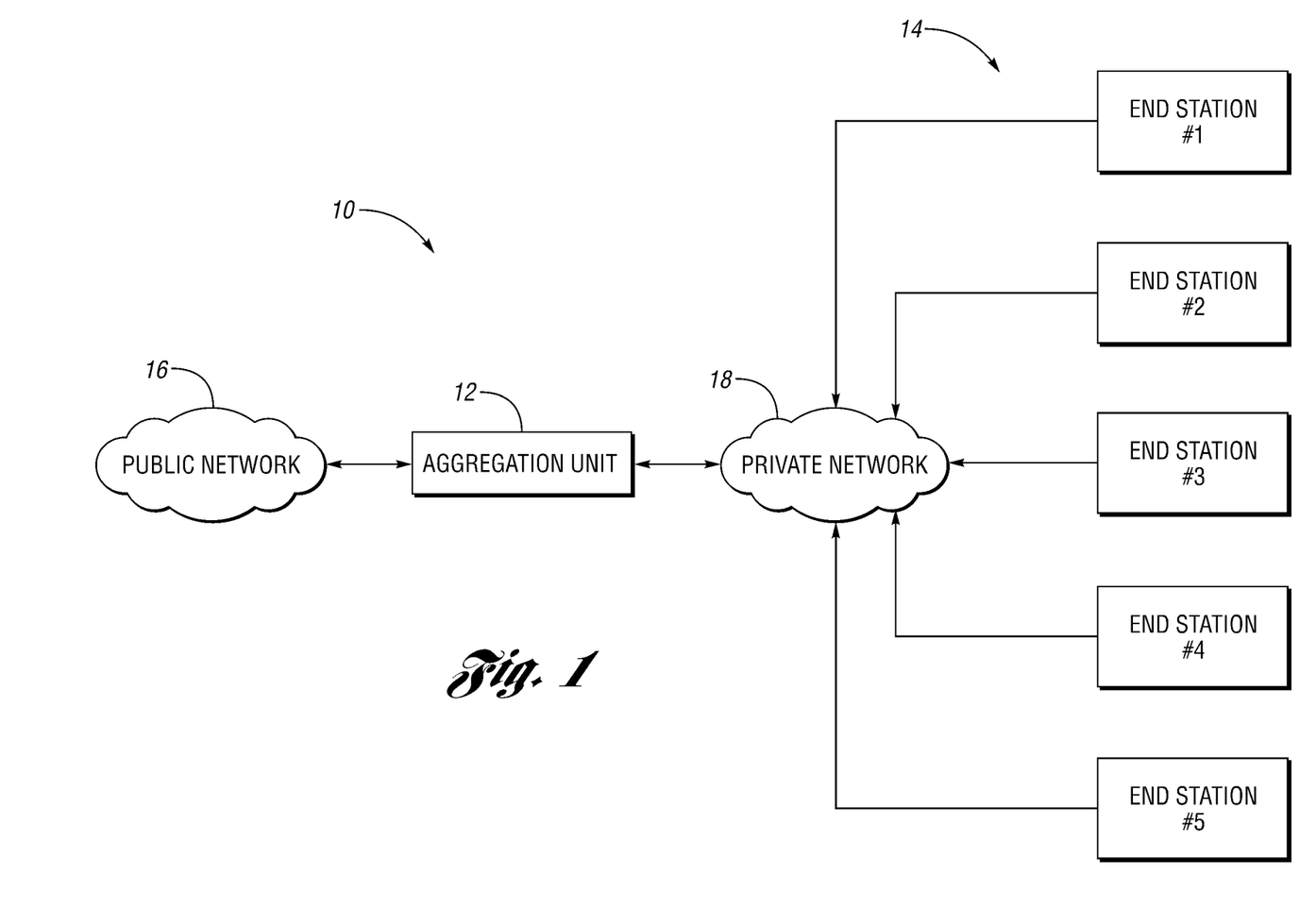
FIG. 1 illustrates a multi-carrier system as contemplated by one non-limiting aspect of the present invention.

FIG. 1 illustrates a multi-carrier system 10 as contemplated by one non-limiting aspect of the present invention. The system 10 is shown to include an aggregating unit 12 cooperating with a plurality of end stations 14 to facilitate any number of electronic, communication-based services. The aggregating unit 12 may be operable to poll each end station 14 individually and adaptively such that polling messages or other types of polling related transmissions may be individually communicated from the aggregating unit 12 to selective ones of the end stations 14 at selective polling intervals. The polling operation may be included as part of a ranging operation where end station capabilities to facilitate signaling with the aggregating unit are determined. The multi-carrier system 10 may be configured to enable delivery of high-speed data (HSD) over coax with frequency division duplexing (FDD) and/or time division duplexing (TDD) depending on the capabilities of the end devices, and optionally while maintaining synchronization.

The aggregating unit 12 may be any type of device operable to facilitate scheduling transmission between a public network 16 and a private network 18. The private network 18 may be operable to support private communications between the aggregating unit 12 and the ends stations 14, such as over a closed network or a private network. The communications may be executed through out-of-band (OOB) messaging or other messaging transmission media and/or protocols operable to facilitate communications between the aggregating unit 12 and the end stations 14. The public network 16 designates the Internet or other potentially less secure or non-proprietary networks over which the end stations 14 may transmit signals for receipt by other devices. The end stations 14 may transmit data according to the OOB or a private protocol, such as to transmit polling related responses/requests, and/or according to protocols used to support IP related communications over the public network 16.

The aggregating unit 12 is shown as a gateway between the public and private networks 16, 18 for exemplary purposes. The aggregating unit 12 need not act as a gateway and the present invention is not intended to be limited to the aggregating unit 12 only supporting communications between public and private networks 16, 18, as communications may be facilitated over entirely public and/or private networks 16, 18. The present invention contemplates its use in many environments where it may be desirable to manage network space by facilitating scheduling of communications sourced from one or more of the end stations 14. The aggregating unit 12 and the end stations 14 may correspond with any type of electronic device and/or logically executing unit and the networks 16, 18 may correspond with any type or combination of wireline and wireless networks, including but not limited to those associated with cable, satellite, or network television; cellular, wireless, or wireline phone communications; and wireless or wireline data transmissions. The transmissions may be facilitated with orthogonal frequency-division multiplexing (OFDM), Data Over Cable Service Interface Specification (DOCSIS), IEEE 802.11 standard for wireless local area networks (WLAN), IEEE 802.16 for wireless networks (WiMax), code/frequency/time division multiple access code (CDMA/FDMA/TDMA) standards for telephony communications, the disclosures of which are hereby incorporated by reference in their entirety, and/or other architectures and standards.

The present invention is predominately described with respect to a cable television related configuration where the aggregating unit 12 may be a cable modem termination system (CMTS) and the private network 18 may correspond with a wireline, cable network provided to a subscriber's home where the end stations 14 may correspond with a cable modem, media terminal adaptor (MTA), settop box (STB), television, or other device desiring data communications over one or more of the networks to support cable related services, such as according to communications executed according to the DOCSIS. These communications may be scheduled according to OFDM such that modulation orders of one or more of the carriers may be adjusted according to the capabilities of the receiving station 14, e.g., higher order modulation may be used with higher performing end stations 14 to maximize data transmissions. This may be beneficial in facilitating maximum efficiency with respect to at least data exchanged between the aggregating unit 12 and the end stations 14, and particularly data transmitted in a downstream direction from the aggregating unit 12 to the end stations 14. Of course, the present invention is not limited to cable related services or cable dependent communications and fully contemplates its application within non-cable environments.

One or more of the end stations 14 may be provided in a subscriber's home, or elsewhere in the event the end station 14 is a mobile device (e.g., PDA, mobile phone, netbook, tablet, etc.). The end stations 14 may be operable to provide or otherwise facilitate access to any number or type of services, such as but not limited to Voice over Internet Protocol (VOIP), channel surfing (e.g., changing television channels tuned to video streams and/or a QAM or IP signaling stream), and file upload/download through P2P or other operations. One non-limiting aspect of the present invention contemplates managing the processing performed by the end stations 14 and/or aggregating unit 12 to support these and other data transmission dependent services. Each of the aggregating unit 12 and the end stations 14 may include a memory, processor, I/O and/or other features necessary to implement the operations contemplated by the present invention. The memory may store code or other computer-readable information to be executed with the processor, such as to facilitate varying modulation orders associated with signals delivered between the aggregating unit 12 and the end stations 14.

Figures 2, 4:
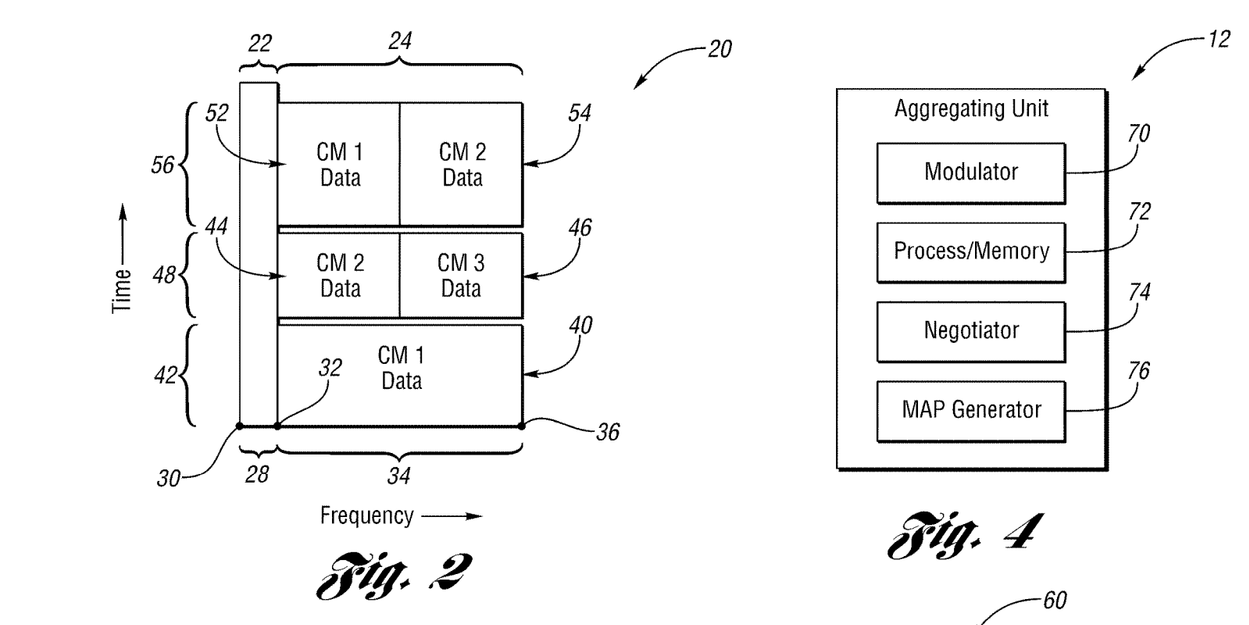
FIG. 2 illustrates a signal configured to facilitate transmission of data in a manner as contemplated by one non-limiting aspect of the present invention.
FIG. 4 illustrates an aggregating unit as contemplated by one non-limiting aspect of the present invention.

FIG. 2 illustrates a signal 20 configured to facilitate transmission of data in a manner as contemplated by one non-limiting aspect of the present invention. The signal 20 is illustrated for exemplary non-limiting purposes as being generated by the aggregating unit 12 to facilitate data transmission to one or more of the end stations 14. The signal 20 may be considered to be a hybrid signal since it includes a control data portion 22 and a user data portion 24. The control data portion 22 may correspond with a continuous transmission of one type of information and the user data portion may correspond with bursty or discontinuous transmission of one or more other types of information. More specifically, the control data portion 22 may be used to transmit signaling information which is desired by all the end stations 14 in order to maintain synchronicity and to otherwise properly receive the signal 20 and the data portion may be used to transmit customer information, such as but not necessarily limited Ethernet frames, which is desired by a selective one or more of the end stations 14.

The signal 20 may include the control data portion 22 to provide control data utilized by the end stations 14 to coordinate signaling with the aggregating unit 12. The control data portion 22 may be used to facilitate continuous transmission of control data to the end stations 14. The control data portion 22 is shown to occupy a first range of frequencies 28 occurring between a first frequency 30 and a second frequency 32. The control data portion 22 may comprise a plurality of subcarriers (not shown), which may also be referred to as carriers, within the first range of frequencies 28. The subcarriers may correspond with individual bands or ranges of frequency defined between the first and second frequencies 30, 32. The control data portion 22 may be considered to be continuously transmitted in that the corresponding frequency portion of the signal 20, i.e., the first range 28, is set aside or otherwise reserved for use only in transmitting the control data. The control data portion 22 may be considered to be continuously transmitted even in the event it is not actively transmitted as long as the corresponding frequency portion 28 of the signal 20 is reserved for transmission of the control data.

The signal 20 may include the user data portion 24 to provide data to the end stations 14, i.e., any information beyond that which is included in the control data. The user data portion 24, for example, may be used to transmit content, media and other user-consumed data or data that is intended to be eventually interfaced with a user. The user data portion 24 may generally correspond with any data desired for receipt by the end stations 14 that is not required for facilitating the construction of the signaling path or establishment of other operating parameters necessary to facilitate delivery of that data to the appropriate one or more of the end stations 14. The user data portion 24, for example, may be used to convey the data used to provide the data-based services delivered to the end stations 14 as part of a subscription or other access granted by a service provider or other content source.

The user data portion 24 is shown to occupy a second range 34 of frequencies occurring between the second frequency 32 and a third frequency 36. The user data portion 24 may comprise a plurality of subcarriers (not shown). The subcarriers may correspond with individual bands or ranges of frequency defined within the second range of frequencies 34, e.g., subsets of frequency ranges or widths defined between the second and third frequencies 32, 36. The user data portion 24 is shown to be segmented according to a cable modem (CM) of the corresponding end station 14 intended to receive a corresponding portion of the transmitted data. Depending on a particular point in time, one or more of the end stations 14 may be receiving data at the same time. The user data portion 24 may be considered to be a "bursty" type of transmission since the intended recipient of the data is varied over time and/or frequency. In other words, the user data portion 24 may be distinguished from the control data portion 22 since the user data portion 24, at least for a given instance of time, is likely to be useful to a selective one or more of the end stations 14 whereas the control data portion 22 is required or at least desired by each end station 14 at all times.

The frequencies ranging from the first frequency 30 to the third frequency 36 are shown to increase from left to right. The number of subcarriers included within the signal 20 may vary depending on a width assigned to each subcarrier. In the event the signal 20 occupies a bandwidth of XHz, i.e., as measured from the first frequency 30 to the third frequency 36, and each subcarrier is YHz wide, the number of subcarriers available to support transmission approximately equals X/Y. The aggregating unit 12 may be configured to provide the subcarriers at any one or more of a plurality of available modulation orders, e.g., 16, 64, 256, 1024 and 4096 QAMs. The width of each subcarrier may be defined according the network requirements or other operating constraints, such as but not necessarily limited to a range of frequencies natively supported by networking devices and/or the end stations 14. The width and/or number of subcarriers included within the signal may dynamically vary according to operating characteristics of the corresponding signaling medium and/or other design requirements or performance requirements of the end stations 14.

The signal 20 is shown to be configured to include a first data set 40 intended for receipt at the first end station during a first instance of time 42. A second data set 44 and a third data set 46 are shown to be respectively transmitted to the second end station and the third end station during a second instance of time 48. A fourth data set 52 and a fifth data set 54 are shown to be respectively transmitted to the first end station 14 and the second end station 14 at a third instance of time 56. The amount of data included within each of the data sets 40, 44, 46, 52, 54 may be proportional to its width (frequency range), height (time/duration) and modulation order of its subcarriers. These parameters may be determined by the aggregating unit 12 according to the amount of data desired for transmission, the transmission performance (noise, ingress, attenuation, echo) of the signaling path, native capabilities of the end stations 14 (some end stations may be unable to properly process certain modulations orders) and any number of other factors. One non-limiting aspect of the present invention contemplates facilitating selection of the modulation order according to the native capabilities of the end station 14 intended to receive one or more of the data sets 40, 44, 46, 52, 54. This may beneficial in maximizing the amount of data transmitted per carrier.

The first data set 40 is shown as being transmitted by the aggregating unit 12 across an entirety of the second frequency range 34 such that it occupies a plurality of subcarriers. This type of transmission may occur, for example, in the event the first end station 14, at least during the first instance of time 42, is natively capable of processing signaling across each of the corresponding frequencies and a transmission medium used to carry the corresponding signaling is able to sufficiently support modulation across each of the subcarriers associated with the higher frequency ranges. The aggregating unit 12 may be configured to assess the native capability ranges of the end stations 14 as part of the polling or ranging operations. Likewise, the aggregating unit 12 may be configured to assess network attenuation, noise, losses or other parameters, such as carrier-to-noise ratios (CNR), to determine acceptable modulation orders, i.e., some modulation orders, particularly higher modulation orders, may be more susceptible to noise and interference than others. The modulation orders available or suitable for communication at a certain point in time may vary depending on network usage and other operating conditions changing, i.e., more or fewer end stations requesting information or transmitting information may result in influences on system performance and corresponding changes to the desirable modulation orders. The bandwidth or number of subcarriers allocated for data transmissions may also vary depending on the amount of data requiring transmission, e.g., larger downloads may be assigned wider portions of the user data portion than smaller downloads.

The second data set 44 and the third data set 46 are shown to occupy a shorter period of time 48 than the first data set 40 as the corresponding data transmission needs may be less. The second end station 14 is intended to receive the second data set 44 at a lower modulation order than the third end station 14 receives the third data set 46, which can result from any number of conditions. The second end station 14 may receive the fifth data set 54 at a higher order of modulation than it received the second data set 44. This may correspond with network transmission medium conditions improving to allow the higher modulation orders or the first end station 14 otherwise being limited to the lower modulation orders such that any losses associated with forcing the higher modulation order for the fifth data set 54 may be acceptable, i.e., even though it may be undesirable from a performance standpoint to transmit data to the second end station 14 at the higher modulation orders such an undesirable performance may be required in the event lower modulation orders are unavailable during the desired transmission interval. The aggregating unit 12 may be configured to compare the various transmission parameters analyzed as part of the ranging or polling operations to thresholds and/or as part of an algorithm-based processing to determine the most desirable modulation orders. These types of dynamic changes in the "bursty" portion 24 may be automatically updated in the information included in the continuous portion 22.

The signal 20 may be considered as a hybrid configuration since it has a portion that is continuous (e.g., the control data portion 22) and another portion that is bursty (e.g., the user data portion 24). The ability to configure the signaling in such a hybrid manner may be beneficial over non-hybrid signals since the entire signal 20 may not necessarily be formatted according to a lowest common denominator or lowest performing end station. The ability to optionally configure signaling with the hybrid configuration may be beneficial in facilitating maximization of signaling capabilities of the transmission medium and/or the end stations. The ability to maximize use of higher modulation orders, at least for end stations 14 capable of receiving them, can be beneficial in maximizing the amount of data transmitted as more data may be transmitted over a given period of time when transmitted at a higher modulation order.

The higher modulation orders, however, may be more susceptible to losses or interference than the lower modulation order such that in some conditions it may be beneficial to transmit at the lower modulation order in order to maintain a desired quality of service (QoS) or otherwise ensure safe transmission of data, i.e., even though an end station 14 may be capable of supporting higher modulation orders it may be desirable to at least temporarily transmit to that end station 14 at lower modulation orders in order to ensure signal integrity. Assuming that an end station 14 has native capabilities sufficient to facilitate processing higher modulation orders and the corresponding communication medium supports the higher modulation order, the present invention contemplates that efficiency will be maximized by allowing at least some data transmission at higher modulation orders.

The present invention contemplates transmitting some data through signals other than the signal 20, e.g., over non-hybrid signals such as a single QAM channel. This may be done in cooperation with transmission of the hybrid signal 20 in order to maintain operation with legacy systems and/or in order to otherwise continue support of single QAM channel communications. In the event single QAM channel communications are required, the corresponding data may be considered to be transmitted over a single subcarrier having a single modulation order, i.e., the data analogous to the control data and the data are transmitted over the same symbol subcarrier width. The modulation order of such a single QAM communication may be restricted to the lowest common denominator such that signaling may be dictated by the end station 14 or communication medium characteristics associated with the lowest performing end station 14 or signaling path. The hybrid configuration 20 may improve the efficiency in such an environment by allowing at least some of the data to be transmitted at higher modulation orders or at least at modulation orders greater than the lowest common denominator. While FIG. 2 illustrates all of the subcarriers within the user data portion 24 being used for the data set transmissions, the present invention is not necessarily so limited and fully contemplates using less than all of the available subcarriers to facilitate data transmissions.

Figure 3:
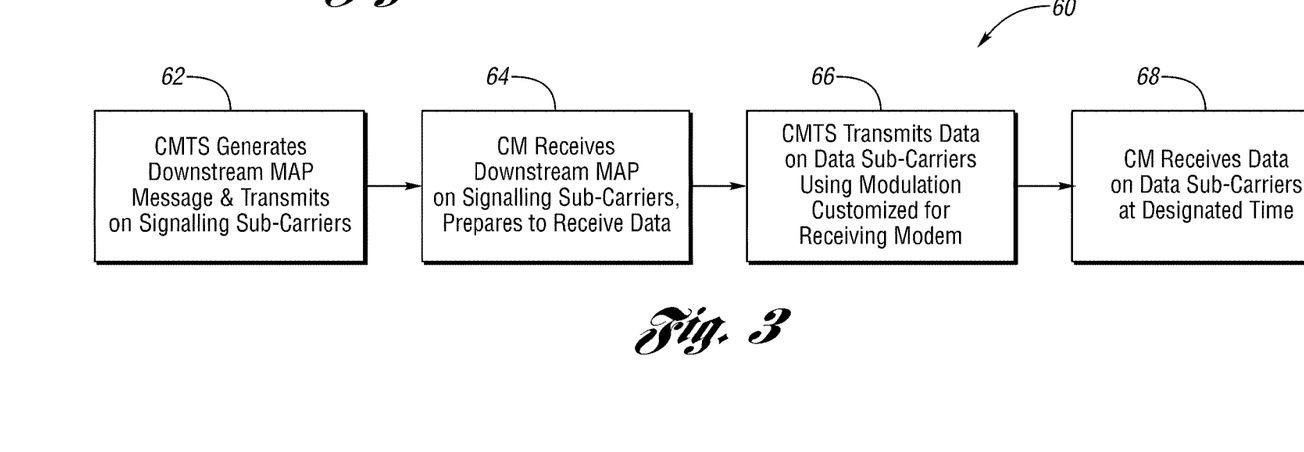
FIG. 3 illustrates a flowchart of a method of facilitating multi-carrier transmission in accordance with one non-limiting aspect of the present invention.

FIG. 3 illustrates a flowchart 60 of a method of facilitating multi-carrier transmission in accordance with one non-limiting aspect of the present invention. The method is predominately described with respect to supporting multi-carrier transmissions between a cable modem termination station (CMTS) and one or more end stations. This is done for exemplary non-limiting purposes as the present invention fully contemplates facilitating multi-carrier transmissions through non-cable dependent communication mediums. Block 62 relates to the CMTS generating a downstream MAP message. The MAP message may be used to apprise each end station of a frequency range (subcarriers), time interval and address at which to listen for data transmissions. The MAP message may be configured in any suitable manner and transmitted as part of the control data to each of the end stations. Optionally, the MAP may be configured in the manner described within U.S. patent application Ser. Nos. 12/826,889; 12/827,496; and 12/954,079 the disclosures of which are hereby incorporated by reference in their entirety.

Block 64 relates to each of the end stations receiving the MAP message and preparing to receive data if corresponding instructions are included. This may include the end stations waking-up or otherwise instigating powering of antennas or I/O ports in preparation of the expected data. Optionally, this may include awakening or powering interfaces other than those used to receive the control data that may have been powered off or otherwise disabled during periods in which data was not expected. The interfaces used to support receipt of the control data may need to remain on at all times or at least more readily available during intervals when the control data is active. In this manner, the present invention particularly leverages use of the hybrid configured signal with the operation and/or configuration of the end stations so that the end stations, particularly those having limited capabilities to process higher modulation orders, are not required to process higher order modulations or to remain active or awake during transmissions having modulation orders beyond their capabilities or which are otherwise not relevant to their operation.

Block 66 relates to the CMTS transmitting data over dynamically selectable data subcarriers using modulation orders customized for the receiving cable modems, e.g., the hybrid signal shown in FIG. 2. This may include transmissions to different devices over different modulation orders customized to their capabilities or the limitations of the signaling path used to communicate with them, transmitting over less than all the available range of subcarriers and/or multiple end stations receiving data at the same time while partitioning one or more subcarriers to each of the simultaneously receiving end stations. The customization of the signal modulation may vary dynamically as operational restraints on the signaling path increase or decrease and/or as the end stations change. An end station configured to receive higher order modulations at one point in time may later be transmitted data at lower modulation orders depending on the signaling path and/or the end station's capabilities relative to other end stations requiring data at the later period of time which were not requiring data at the previous period of time. This may occur when two end stations having equal capabilities to facilitate higher modulation orders are intended to receive data at the same time and one of the end stations has a lower subscription priority than another such that the lower subscription priority end station may be required to receive the lower modulation order.

Block 68 relates to the end stations (e.g., cable modems) listening to the signal for the intended data. This may include one or more end stations looking for user data portions addressed to them at a designated time and a designated frequency. The end stations may be required to awaken or to perform other operations in order to facilitate receipt of the desired data. The listening operation may include the end station being required to change from disregarding the user data portion to beginning processing of the user data portion, which may occur in addition to ongoing processing of the control data. In other words, instead of simply listening to the control data, the end station may now be required to listen to both of the control data and the user data portion. Optionally, the end stations may be configured to instruct the aggregating unit or other device associated with configuring the hybrid signal as to the desired modulation order or modulation order available at the end station for the desired transmission interval. This capability may be beneficial in situations in which the end station detects an error condition or other event which would prevent it from listening to the signal at the modulation order determined by the aggregating unit. The end station may be configured to notify the aggregating unit of such a condition after reviewing the MAP in order to request the aggregating unit to change the modulation order to a more suitable frequency range.

FIG. 4 illustrates the aggregating unit 12 as contemplated by one non-limiting aspect of the present invention. The aggregating unit 12 may include a modulator 70, a processor/memory 72, a negotiator 74, and a MAP generator 76, which are shown to be separate stand-alone items for exemplary non-limiting purposes as the functions associated there with may be part of a computer or software application configured to facilitate operations required of the aggregating unit 12 facilitate the hybrid signaling contemplated by the present invention. The modulator 70 may be configured to generate the hybrid signal illustrated in FIG. 2 according to instructions received from the processor/memory 72. The negotiator 74 may be configured to facilitate ranging operations or other interactions between the aggregating unit 12 and the end stations 14 associated with determining the performance capabilities or other factors associated with determining modulation orders suitable to facilitating the desired communications. The MAP generator 76 may be configured to generate the MAP transmitted to the end stations 14 within the control data in order to apprise the end stations 14 when to listen to the user data portion 24 of the signal 20 and/or the addressing of the user data portion 24 relevant to each of the end stations 14.

As supported above, one non-limiting aspect of the present invention contemplates a multi-carrier system-such as one based on OFDM rather than single QAM channels since not all of the sub-carriers may be necessary to maintain that continuous signal for synchronization, etc. The present invention contemplates configuring a small set of sub-carriers to operate with a very robust modulation scheme, and to serve as the constant signal that CPE devices require. With the remaining sub-carriers, a headend device or other sourcing entity could vary the modulation order depending on the device that will be receiving the data being transmitted during a given time interval. The modulation order to use for each of those sub-carriers may be negotiated, enabling the best possible performance for each device in the network based on its capability and the plant conditions where it is located.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of facilitating delivery of a hybrid signal from an aggregating unit to first and second end stations disposed remotely from the aggregating unit, the method comprising the steps of:

modulating a first portion of the hybrid signal according to a first modulation order;

modulating a second portion of the hybrid signal according to a second modulation order different from the first modulation order;

transmitting the hybrid signal over a point-to-multipoint network from the aggregating unit to each of the first and second end stations, wherein the first portion the hybrid signal includes a control portion configured to contain control data for the first and second end stations, wherein the second portion of the hybrid signal includes a user portion configured to contain user data for each of the first and second end stations, wherein the first portion of the hybrid signal is continuously transmitted within a first frequency band to provide synchronization information to both of the first and second end stations to maintain synchronicity with the hybrid signal and remain locked thereto, wherein the second portion of the hybrid signal (a) is transmitted to both of the first and second end stations within a second frequency band different from the first frequency band, and (b) includes a first burst signal containing a first user data set for the first end station and a second burst signal containing a second user data set for the second end station, and wherein the first burst signal (a) overlaps in frequency with the second burst signal within the second frequency band, (b) does not overlap in time with the second burst signal, (c) overlaps in time with the continuous first portion of the hybrid signal, and (d) does not overlap in frequency with the continuous first portion of the hybrid signal.

2. The method of claim 1, wherein the step of transmitting is performed wirelessly.

3. The method of claim 1, wherein the step of transmitting is performed non-wirelessly.

4. A multi-carrier system configured to transport a hybrid signal from a signal source to first and second end user devices over a communication network, the system comprising:

an access point including:

i) a negotiator configured to determine modulation orders available to facilitate transport of the hybrid signal over the communication network;

ii) a resource message generator configured to iteratively generate a resource message for inclusion within the hybrid signal, the resource message being sufficient for identifying portions of the hybrid signal to be processed by each of the first and second end user devices at a corresponding point in time to receive first and second user data sets, respectively; and iii) a modulator configured to modulate a first part of the hybrid signal for the resource message according to a first modulation order of the modulation orders and a second part of the hybrid signal for the first and second user data sets according to a second modulation order of the modulation orders, wherein the first and the second modulation orders are different from one another, wherein the modulator is further configured to (a) continuously reserve the first part of the hybrid signal at all times to iteratively transmit the resource message within a first frequency range such that the first and second user data sets are excluded from the first frequency range at all times, and (b) vary the second modulation order within the second part to independently transmit the first and second user data sets as first and second burst signals, respectively, within a second frequency range separate from the first frequency range;

wherein the resource message generator is configured to iteratively generate the resource message from the first part of the hybrid signal to specify one or more segments for the second part of the hybrid signal to enable the first and second end user devices to receive respective user data, wherein the resource message is configured to specify:

i) in a first iteration of the resource message, a first segment for a higher-order device of the first and second end user devices, and a second segment for a lower-order device of the first and second end user devices; and ii) in a second iteration of the resource message, a third segment for the higher-order device, wherein the first segment of the second part of the hybrid signal (a) overlaps in frequency with the second and third segments within the second frequency range, (b) does not overlap in time with the second or third segment, (c) overlaps in time with the resource message from the first part of the hybrid signal, and (d) does not overlap in frequency with the resource message.

5. The multi-carrier system of claim 4, wherein the modulator is further configured to simultaneously and concurrently transmit each iteration of the resource message with the first and second user data sets, and wherein each of the first and second end user devices are configured to correspondingly process each iteration of the resource message to determine which segment of the hybrid signal is to be listened, to receive one of the transmitted first and second user data sets.

6. The multi-carrier system of claim 4, wherein the resource message generator is further configured to transmit:

(a) the first iteration of the resource message at a first instance to identify portions of the hybrid signal to be processed by each of the first and second end user devices to receive the first and second user data sets, respectively, at a second instance occurring after the first instance; and (b) the second iteration of the resource message at the second instance to identify portions of the hybrid signal to be processed by each of the first and second end user devices to receive the first and second user data sets, respectively, at a third instance occurring after the second instance.

7. The multi-carrier system of claim 6, wherein the negotiator is further configured to:

receive an error message communicated from the first end user device indicating an inability of the first end user device, during the first instance, to process the first user data set transmitted within the first segment of the second frequency range, wherein the first end user device is the higher-order device;

instruct the resource message generator to identify a different segment within the second frequency range for the first end user device to process during the third instance; and instruct the modulator to re-transmit the first user data set for the first end user device transmitted during the first instance over the different segment during the third instance.

8. The multi-carrier system of claim 4, wherein the resource message generator is further configured to generate the resource message to specify time periods during which one or more interfaces included on each of the first and second end user devices are to be powered or enabled for purposes of listening to the hybrid signal, wherein the interfaces are otherwise configured to be powered off and correspondingly prevented from listening to the hybrid signal.

9. The method of claim 1, wherein the step of transmitting the hybrid signal is executed using one or more of frequency domain duplexing (FDD), time domain duplexing (TDD) and orthogonal frequency-division multiplexing (OFDM).

10. The method of claim 1, wherein the control data includes listening information, and wherein each of the first and second end stations is configured to receive and process the listening information to determine when to individually listen to which carrier is being used to transmit the user data within the second frequency range independently of the control data transmitted within the first frequency range.

11. The method of claim 10, further comprising the steps of:

determining a frequency limitation for each of the first and second end stations, wherein the frequency limitation identifies a maximum frequency for which the corresponding end station is able to process; and modulating the first and second user data sets according to the frequency limitation of each of the first and second end stations such that the first and second user data sets are modulated entirely within the second frequency range lower than the frequency limitation of the respective first or second end stations.

12. The method of claim 10, wherein the aggregating unit further comprises a cable modem termination system (CMTS), wherein the first and second end stations include cable modems (CMs), wherein the hybrid signal originates from the CMTS, wherein the CMTS includes a MAP message as part of the listening information, and wherein the MAP message is continuously transmitted and updated over time to specify at least one of a frequency range, a time interval, and an address needed for each CM when intended to listen to the user portion.

13. The method of claim 1, wherein the second modulation order is selected by the one of the first and second end stations.

14. The method of claim 1, wherein the user data comprises at least two data packets characterized by different modulation orders.

15. The method of claim 1, wherein the second portion of the hybrid signal further includes a third burst signal containing a third user data set for the first end station, and wherein the third burst signal (a) overlaps in frequency with the first and second burst signals within the second frequency band, (b) does not overlap in time with the first or second burst signals, (c) overlaps in time with the continuous first portion of the hybrid signal, and (d) does not overlap in frequency with the continuous first portion of the hybrid signal.

16. The method of claim 15, wherein the second portion of the hybrid signal further includes a fourth burst signal containing a fourth user data set for the second end station, and wherein the fourth burst signal (a) overlaps in frequency with the first burst signal within the second frequency band, (b) does not overlap in frequency with the second and third burst signals within the second frequency band, (c) does not overlap in time with the first or second burst signals, (d) overlaps in time with the third burst signal, (e) overlaps in time with the continuous first portion of the hybrid signal, and (f) does not overlap in frequency with the continuous first portion of the hybrid signal.

17. The method of claim 16, wherein the second portion of the hybrid signal further includes a fifth burst signal containing a fifth user data set for a third end station different from the first and second end stations, and wherein the fifth burst signal (a) overlaps in frequency with the first and fourth burst signals within the second frequency band, (b) does not overlap in frequency with the second and third burst signals within the second frequency band, (c) does not overlap in time with the first or third burst signals, (d) overlaps in time with the second burst signal, (e) overlaps in time with the continuous first portion of the hybrid signal, and (f) does not overlap in frequency with the continuous first portion of the hybrid signal.

18. The multi-carrier system of claim 4, wherein the resource message is configured to specify a fourth segment of the second part of the hybrid signal, wherein the fourth segment (a) overlaps in frequency with first segment within the second frequency range, (b) does not overlap in time with the first or second segments, (c) overlaps in time with the third segment, (d) overlaps in time with the resource message from the first part of the hybrid signal, and (e) does not overlap in frequency with the resource message.

19. The multi-carrier system of claim 18, wherein the resource message is configured to specify a fifth segment of the second part of the hybrid signal for a third end user device of lower order than the higher-order device, wherein the fifth segment (a) overlaps in frequency with the first and fourth segments within the second frequency band, (b) does not overlap in frequency with the second or third segments, (c) does not overlap in time with the first or third burst segments, (d) overlaps in time with the second segment, (e) overlaps in time with the resource message from the first part of the hybrid signal, and (f) does not overlap in frequency with the resource message.

* * * * *